United States Patent Office 2,921,049
Patented Jan. 12, 1960

2,921,049

EPOXY RESIN AND PROCESS OF MAKING AND CURING THE SAME

Harold L. Moroson, Elizabeth, N.J., assignor to Reichhold Chemicals, Inc., Detroit, Mich.

No Drawing. Application September 16, 1955
Serial No. 534,863

5 Claims. (Cl. 260—47)

The invention relates to improvements in epoxy resins, and more particularly to a process of producing an epoxy resin which is liquid at ordinary room temperatures and having a melting point range of 0-6° C., and to the process of curing such liquid resin.

The present application is a continuation-in-part of my application Serial No. 517,399, filed June 22, 1955, entitled Epoxy Resin and Process of Making and Curing the Same.

In accordance with the present invention azeotropic distillation is employed to produce a low viscosity epoxy resin from an intermediate liquid epoxy resin produced by the reaction of 2 to 3 moles of epichlorohydrin to 1 mole of bis-phenol (diphenylolpropane) as initial ingredients, and operating preferably under alkaline conditions using a suitable alkaline catalyst, such as an alkaline metal hydroxide, in the presence of a suitable nonreactive soluble diluent which may be removed by distillation.

In carrying out my invention the liquid epoxy resin intermediate is first produced by reacting the epichlorohydrin and bis-phenol, followed by the addition of a suitable amount of epichlorohydrin and water, after which azeotropic distillation is resorted to with substantially complete recovery of the epichlorohydrin.

The production of several grades of liquid epoxy resins of varying viscosities from one intermediate resin may be accomplished by simply varying the amount of epichlorohydrin added to the epoxy intermediate to form the azeotrope. As an example, the liquid epoxy intermediate may be formed from 2 moles of epichlorohydrin to 1 mole of bisphenol under alkaline conditions, followed by the addition of .9 mole of epichlorohydrin and water and the distillation of the azeotropic mixture. During such distillation the .9 mole of epichlorohydrin is substantially completely recovered from the azeotrope.

There are recorded in the patent literature essentially two methods of producing a liquid epoxy resin of such a viscosity as to be easisly pourable at room temperatures, that is with a viscosity of 50-150 poises.

One method is to add small amounts of a diluent to a high viscosity resin, which was heretofore more economical to produce. The diluent may be reactive, that is it may contain an epoxide group, such as phenyl glycidyl ether or styrene oxide, as set forth in U.S. Patent No. 2,528,932, dated November 7, 1950, or the diluent may be essentially unreactive, as for example toluene or Butyl Cellosolve.

A second method is to carry out the reaction between the epichlorohydrin and bis-phenol to form the epoxy resin, with a large stoichiometric excess of epichlorohydrin. The mechanism of this reaction is not clearly set forth, but the excess epichlorohydrin may act as a chain terminator, preventing the epoxy resin from polymerizing past a certain molecular weight.

In the patent to Werner et al., No. 2,467,171, dated April 12, 1949 there is disclosed the product of reaction obtained from employing two to three times the amount of epichlorohydrin actually required to attach a glycidyl radical to the oxygen atom of each hydroxyl group of bis-phenol.

The liquid form of epoxy resin of low viscosity has the structure of the diglycidyl ether of bis-phenol as follows:

(I)
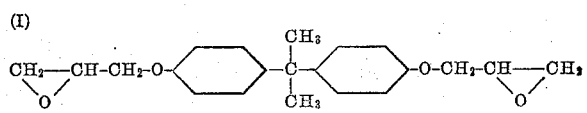

Higher molecular weight epoxy resins, or longer chain molecules cause increased viscosity. The structure of these longer chains is as follows:

(II)
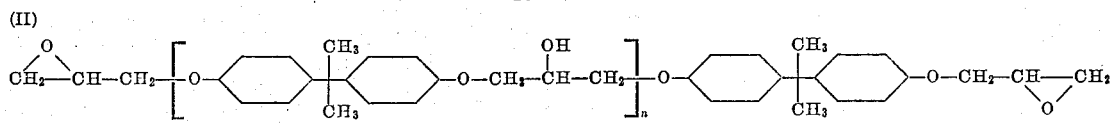

where $n$ is an integer of the series 1, 2, 3, etc. As $n$ increases, so does the viscosity, until the epoxy resin approaches a solid, fusible material.

It is fully recognized that the epoxy resin consists of mixtures of molecules of different molecular weights, and that any measured molecular weight is actually an average molecular weight.

One method of determining molecular weight is by determining the number of α-epoxide groups in a given weight of the epoxy resin. Devoe & Raynolds Company has devised a method based on the hydrohalogenation of the α-epoxy group in pyridine solution. Pyridine is a good solvent for epoxy resins and pyridinium chloride is effective in the hydrohalogenation reaction.

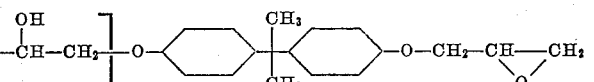

The recation with excess 0.2 N pyridinium chloride in pyridine is conducted at the boiling point of the reaction mixture (near 115° C.) for twenty minutes. After cooling, the unconsumed acid is titrated with 0.1 N sodium hydroxide solution to the phenolphthalein end point.

It was found that for samples of relatively low molecular weight improved end point precision and better accuracy could be obtained by employing a stronger reagent, i.e., 1 N pyridinium chloride in pyridine, and correspondingly larger sample sizes. Difficulty was frequently encountered with the formation of dark brown precipitate which obscured the end point. This can be avoided by preparing 1 N pyridinium chloride in chloroform, and using this instead of the pyridine solution.

When two moles of epichlorohydrin are reacted with one mole of bis-phenol in the presence of two moles of sodium hydroxide solution (aqueous), according to the procedure as disclosed in many references, the product of reaction is always a highly viscous liquid or even a semi-solid.

When a substantial stoichiometric excess of epichlorohydrin is employed in the same reaction conditions, a liquid product of pourable viscosity is obtained, see U.S. Patent No. 2,467,171, dated April 12, 1949, Example IV, and U.S. Patent No. 2,643,243, dated June 23, 1953, Example A. This method of producing relatively low viscosity epoxy resins of 50-150 poises is wasteful of an expensive raw material, epichlorohydrin, which must be recovered by distilling and purifying.

I have discovered that a liquid epoxy resin having desirable properties may be obtained without the use of large excess amounts of epichlorohydrin, and without employing reactive diluents. Among the distinctive features of my process may be mentioned the following:

(1) The use of low temperature reaction conditions, approximately in the range of 40-70° C., and preferably not exceeding 60° C. to produce the resin intermediate.

(2) The use of inexpensive inert organic solvents in the reaction medium to act as a reaction diluent, which are then removed from the epoxy resin intermediate. These solvents are taken from the class of alcohols, particularly monohydric alcohols, ketones, or ethers or mixtures thereof which are soluble in water and in epichlorohydrin.

(3) Carrying out the distillation of the epoxy resin intermediate in the presence of added epichlorohydrin, which forms an azeotrope with the water present.

(4) The production of a liquid epoxy resin with only minor losses of epichlorohydrin by the formation of a water-epichlorohydrin azeotrope, which splits into two layers.

(5) The production of lower viscosity epoxy resins by the use of azeotropic distillation of the epoxy resin intermediate, the distillation temperature being controlled by the constant boiling azeotrope.

(6) The production of several viscosity grades of liquid epoxy resin from one intermediate by simply varying the amount of added epichlorohydrin to the epoxy intermediate, which will form an azeotrope.

(7) The production of a liquid epoxy resin intermediate from 2 to 3 moles of epichlorohydrin to 1 mole of bis-phenol under alkaline conditions, and then distilling the intermediate obtained in the presence of .90 moles epichlorohydrin. This .90 moles of epichlorohydrin to be almost completely recovered in the azeotrope.

To prepare a liquid epoxy resin of viscosity 50-150 poises I preferably use the molar ratio of 2-2.9 moles epichlorohydrin to 1 mole of bis-phenol, and then add .1-.9 mole of epichlorohydrin to the resulting resin intermediate prior to the distillation phase, the total moles of epichlorohydrin to moles of bis-phenol not to exceed 3 to 1.

The reaction is carried out under low temperature conditions (40-50° C.) as described in the illustrative example below.

The advantages of this procedure are seen by the lower costs involved, since large excess amounts of epichlorohydrin do not have to be used and then recovered in order to prepare a low viscosity resin.

To aid in understanding the illustrative examples the following facts are given:

(a) Epichlorohydrin and water mixtures separate into two layers at equilibrium, with the compositions:

Lower layer—
98% epichlorohydrin
2% water

Upper layer—
93% water
7% epichlorohydrin (b) Water and epichlorohydrin form a constant boiling azeotrope, boiling at 88° C. Composition of the distillate is 75% epichlorohydrin and 25% water.

EXAMPLE I

|  | Grams | Moles |
|---|---|---|
| Epichlorohydrin | 461 | 5.0 |
| Water | 44 | |
| Ethanol | 88 | |
| Butyl Cellusolve | 88 | |
| Bis-phenol | 456 | 2.0 |

Mix ingredients together in a 3 liter 3 neck flask fitted with agitator, thermometer and dropping funnel. The flask is suspended in an empty water bath. In the dropping funnel is placed a caustic solution NaOH _____ 156
Water _____ 156

Start agitation, and when solution is clear slowly add the caustic solution through the dropping funnel. The temperature will start to rise, and when 45° C. is reached cold water is added over the flask into the water bath to break the reaction. The temperature is controlled between 45-50° C., while the caustic solution is added during a 105 minute period. The mixture is refluxed an additional 15 minutes at 45-50° C., at which point 500 grams of cold water is added to the flask directly.

Agitation is continued another 15 minutes, the flask removed from the water bath, and the contents placed into a 2 liter separatory funnel. The reaction mixture initially separates into two layers. The bottom water layer (800 ml.) is withdrawn, and the top resin layer (900 ml.) is shaken again with 500 ml. of fresh water, to remove all traces of sodium chloride, and sodium hydroxide. This mixture again separates into two layers, the resin layer being on the bottom (760 ml.) and the water layer on top (640 ml.).

The resin (intermediate) layer of 840 gm. is divided into four portions, A, B, C and D of 200 grams each. Each portion is placed in a 250 ml. round bottomed flask fitted for distillation. Total yield of epoxy resin A+B+C+D was 670 grams. (Theoretical—680 grams.)

Table I

| Distillation Conditions | Epichlorohydrin in distillate, grams | Resin Viscosity, Gardner Holdt |
|---|---|---|
| A. Vacuum Dist. 28" Hg. Pot Temp. 96° C | 21 | Z3 |
| B. Add 10% Epichlorohydrin Azeotropic distillation to Pot temp. 96° C., Vapor temp. 89° C. At end apply vacuum of 28" Hg | 42 | Z2 |
| C. No added Epichlorohydrin Azeotropic distillation to Pot temp. 115° C., Vapor temp. 92° C. At end apply vacuum of 28" Hg | 24 | Z4 |
| D. Add 10% Epichlorohydrin Azeotropic distillation to Pot temp. 121° C., Vapor temp. 94° C. At end apply vacuum of 28" Hg | 48 | Z4-Z5 |

Curing data.—100 grams of epoxy resin from Example I was mixed well with 17 grams of any suitable amine adduct hardener, such hardeners being well known in the art. The mixture was placed in a paper cup (4 oz.) and a thermocouple inserted in the center of the mass.

The maximum temperature reached is known as the peak exotherm. The time from the end of the mixing to the peak exotherm is known as the gel time.

Table II

| Resin | Peak Exotherm, ° C. | Gel Time, Minutes |
|---|---|---|
| A | 174 | 9 |
| B | 185 | 10 |
| C | 174 | 10 |
| D | 174 | 11 |
| Epon 828 | 174 | 14 |

(A representative liquid epoxy resin of viscosity Z5-Z6.)

The excess epichlorohydrin is almost completely recovered by use of the azeotropic process as is indicated in the second column of Table I.

If the conditions of low temperature and azeotropic distillation are not followed high viscosity epoxy resins will result.

EXAMPLE II

Same formula and procedure as Example I, with the exception that the temperature of reflux is allowed to reach 66° C. The washed resin intermediate appears to be slightly more viscous than in Example I. It is divided into two parts (F and G) of 250 grams each, and distilled.

Table III

| Conditions of Distillation | Resin Viscosity | Epichlorohydrin in Distillate, Grams |
|---|---|---|
| F. No added epichlorohydrin Azeotropic distillation to Pot Temp. 115° C., Vapor temp. 92° C. At end apply vacuum 28″ Hg. | >>Z6 | 28 |
| G. Add 10% epichlorohydrin Azeotropic distillation, to Pot temp. 121° C., vapor temp. 94° C. Then apply vacuum 28″ Hg. | Z6 | 56 |

Table IV

| Resin | Peak Exotherm, °C. | Gel Time, Minutes |
|---|---|---|
| F | | |
| G | 178 | 10 |

The invention has been described in detail for the purpose of illustration, but it will be obvious that numerous modifications and variations may be resorted to within the scope of the accompanying claims without departing from the spirit of the invention in its broadest aspects.

Thus, while in the specific examples sodium hydroxide is used in the intial stages as the alkaline catalysts, other catalysts may be employed as is well known in the art, particularly materials for insuring an alkaline condition during the initial reaction to produce the epoxy resin intermediate.

Also, other non-reactive diluents than those mentioned in the specific example may be employed provided they are soluble in water and in epichlorohydrin. As examples may be mentioned acetone, methyl ethyl ketone, dioxane, ethanol, propanol, Butyl Cellosolve (ethylene glycol monobutyl ether) and the like. The amount of such solvent used is desirably within the range of 15–30%, and preferably about 25% by weight of the epichlorohydrin in the initial reaction mixture.

Numerous curing agents are known to the art, and as suitable amine curing agents may be mentioned ethylene diamine, diethylene triamine, triethylene tetramine, and the like.

The above materials are given as illustrative only and not as limiting the invention to the particular materials set forth.

I claim:

1. A process of producing a liquid epoxy resin which comprises initially reacting diphenylolpropane and epichlorohydrin in the proportion of 2 to 3 moles of epichlorohydrin to 1 mole of diphenylolpropane under alkaline conditions at a temperature within the approximate range of 40 to 70° C. to produce a resin intermediate, thereafter adding to the resinous reaction mixture from 10 to 25% of its weight of epichlorohydrin and then azeotropically stripping the resinous intermediate to produce a final liquid resin of desired viscosity with substantially complete recovery of the added epichlorohydrin.

2. A process as set forth in claim 1, wherein 2 moles of epichlorohydrin are employed per mole of diphenylolpropane.

3. A process as set forth in claim 2, wherein 10% by weight of epichlorohydrin are added to the intermediate reaction product with subsequent substantially complete recovery of the added epichlorohydrin.

4. A process as set forth in claim 1, wherein the intermediate resin is produced by conducting the etherification of the diphenylolpropane with epichlorohydrin after having added about 30% by weight, based on the diphenylolpropane, of a volatile organic solvent as a diluent to the reaction mixture, followed by removal of the diluent after completion of the reaction.

5. A process as set forth in claim 4, wherein the diluent is selected from a group consiting of water soluble alcohols, ketones and ethers and mixtures thereof which are also soluble in epichlorohydrin.

References Cited in the file of this patent

UNITED STATES PATENTS

| | | |
|---|---|---|
| 2,361,715 | Swain | Oct. 31, 1944 |
| 2,467,171 | Werner | Apr. 12, 1949 |
| 2,528,932 | Wiles | Nov. 7, 1950 |
| 2,573,678 | Saunders | Nov. 6, 1951 |
| 2,643,243 | Dannenberg | June 23, 1953 |
| 2,732,367 | Shokal | Jan. 24, 1956 |
| 2,824,855 | Freeman et al. | Feb. 25, 1958 |

OTHER REFERENCES

Schrade: Kunststoffe, vol. 43, pages 266–270, 1953. (Copy in Scientific Library.)